United States Patent
Bowen

(10) Patent No.: US 11,698,781 B2
(45) Date of Patent: *Jul. 11, 2023

(54) SYSTEM AND METHOD FOR UPGRADING KERNELS IN CLOUD COMPUTING ENVIRONMENTS

(71) Applicant: Suse LLC, Wilmington, DE (US)

(72) Inventor: Peter Bowen, Ottawa (CA)

(73) Assignee: Suse LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/075,654

(22) Filed: Mar. 21, 2016

(65) Prior Publication Data

US 2016/0274896 A1    Sep. 22, 2016

Related U.S. Application Data

(63) Continuation of application No. 13/959,146, filed on Aug. 5, 2013, now Pat. No. 9,292,275, which is a
(Continued)

(51) Int. Cl.
*G06F 8/65* (2018.01)
*G06F 9/455* (2018.01)
(Continued)

(52) U.S. Cl.
CPC ............. *G06F 8/65* (2013.01); *G06F 8/656* (2018.02); *G06F 9/45558* (2013.01); *H04L 67/02* (2013.01); *H04L 67/1097* (2013.01)

(58) Field of Classification Search
CPC ............. G06F 9/45533; G06F 9/45558; G06F 2009/45562; G06F 2009/4557
(Continued)

(56) References Cited

U.S. PATENT DOCUMENTS 5,548,740 A * 8/1996 Kiyohara ............... G06F 12/08
                                                                345/502
5,617,568 A   4/1997 Ault et al.
(Continued)

OTHER PUBLICATIONS

"Building modules for a precompiled kernel", <https://linux.die.net/lkmpg/x380.html> as archived by the Internet Archive project on Nov. 17, 2009 <https://archive.org/web/web.php> (Year: 2009).*
(Continued)

*Primary Examiner* — Jason D Mitchell

(57) ABSTRACT

The system and method described herein may upgrade kernels in cloud images deployed in cloud computing environments without having to rebuild a machine image that contains a root file system for the cloud image. For example, the cloud image may include a ramdisk that compares the kernel booted in the cloud image to the root file system to verify whether the machine image contains a directory hierarchy matching an operating system release for the kernel. In response to the machine image containing the matching directory hierarchy, the root file system may be mounted for execution in the cloud computing environment. Alternatively, in response to the machine image lacking the matching directory hierarchy, the ramdisk may dynamically create the matching directory hierarchy and inject modules that support the kernel into the root file system prior to mounting and delivering control to the root file system.

19 Claims, 4 Drawing Sheets

Related U.S. Application Data continuation of application No. 12/769,357, filed on Apr. 28, 2010, now Pat. No. 8,505,003.

(51) Int. Cl.
  *G06F 8/656* (2018.01)
  *H04L 67/02* (2022.01)
  *H04L 67/1097* (2022.01)

(58) Field of Classification Search
  USPC ................................... 718/1; 717/168–178
  See application file for complete search history.

(56) References Cited

U.S. PATENT DOCUMENTS

| | | | |
|---|---|---|---|
| 5,923,850 A | 7/1999 | Barroux | |
| 6,161,218 A | 12/2000 | Taylor | |
| 6,220,768 B1 | 4/2001 | Barroux | |
| 6,496,979 B1 | 12/2002 | Chen et al. | |
| 6,615,405 B1 | 9/2003 | Golman et al. | |
| 6,704,933 B1* | 3/2004 | Tanaka | G06F 8/60 |
| | | | 348/E5.006 |
| 6,754,895 B1* | 6/2004 | Bartel | H04M 1/72406 |
| | | | 717/171 |
| 6,959,320 B2 | 10/2005 | Shah et al. | |
| 6,961,931 B2 | 11/2005 | Fischer | |
| 6,961,941 B1 | 11/2005 | Nelson et al. | |
| 7,069,271 B1 | 6/2006 | Fadel et al. | |
| 7,082,598 B1 | 7/2006 | Le et al. | |
| 7,127,712 B1 | 10/2006 | Noble et al. | |
| 7,165,137 B2* | 1/2007 | Chang | G06F 9/4403 |
| | | | 710/200 |
| 7,263,699 B2 | 8/2007 | Jacquemot et al. | |
| 7,356,679 B1 | 4/2008 | Le et al. | |
| 7,379,982 B2 | 5/2008 | Tabbara | |
| 7,412,700 B2 | 8/2008 | Lari et al. | |
| 7,562,208 B1 | 7/2009 | Reed et al. | |
| 7,594,139 B2 | 9/2009 | Nellitheertha | |
| 7,627,866 B2 | 12/2009 | Bunker et al. | |
| 7,761,503 B2 | 7/2010 | Dhawan et al. | |
| 7,774,774 B1* | 8/2010 | Mulligan | G06F 9/44505 |
| | | | 717/176 |
| 7,840,955 B1 | 11/2010 | Weathersby et al. | |
| 7,904,923 B2* | 3/2011 | Putterman | H04L 67/2838 |
| | | | 725/50 |
| 7,945,897 B1* | 5/2011 | Cook | G06F 9/445 |
| | | | 709/226 |
| 7,996,498 B2 | 8/2011 | Huang | |
| 8,032,740 B2* | 10/2011 | Haverkamp | G06F 8/65 |
| | | | 713/2 |
| 8,102,881 B1* | 1/2012 | Vincent | H04L 69/12 |
| | | | 370/474 |
| 8,108,734 B2 | 1/2012 | Andrews et al. | |
| 8,112,620 B2 | 2/2012 | Manczak et al. | |
| 8,145,798 B1 | 3/2012 | Buck et al. | |
| 8,176,094 B2* | 5/2012 | Friedman | G06F 11/3664 |
| | | | 718/1 |
| 8,176,311 B1 | 5/2012 | Srinivasan et al. | |
| 8,190,587 B1 | 5/2012 | Caradonna et al. | |
| 8,209,680 B1 | 6/2012 | Le et al. | |
| 8,219,653 B1 | 7/2012 | Keagy et al. | |
| 8,239,509 B2 | 8/2012 | Ferris et al. | |
| 8,250,567 B2 | 8/2012 | Gesquiere et al. | |
| 8,255,362 B2 | 8/2012 | Johnson et al. | |
| 8,255,363 B2 | 8/2012 | Johnson et al. | |
| 8,271,974 B2 | 9/2012 | Mazhar et al. | |
| 8,327,351 B2 | 12/2012 | Paladino et al. | |
| 8,352,939 B1* | 1/2013 | Edwards | G06F 9/45533 |
| | | | 707/755 |
| 8,402,453 B2 | 3/2013 | Gupta et al. | |
| 8,402,454 B2 | 3/2013 | Wang et al. | |
| 8,505,003 B2* | 8/2013 | Bowen | G06F 8/67 |
| | | | 717/168 |
| 8,935,688 B2 | 1/2015 | Cornwell et al. | |
| 8,966,475 B2* | 2/2015 | Srinivasan | G06F 9/5077 |
| | | | 718/1 |
| 9,038,051 B1* | 5/2015 | Zweifel | G06F 8/65 |
| | | | 717/169 |
| 9,292,275 B2 | 3/2016 | Bowen | |
| 9,747,091 B1* | 8/2017 | Berg | G06F 8/61 |
| 2002/0188935 A1* | 12/2002 | Hertling | G06F 8/65 |
| | | | 717/170 |
| 2003/0074487 A1* | 4/2003 | Akgul | G06F 8/67 |
| | | | 719/328 |
| 2004/0088692 A1* | 5/2004 | Stutton | G06F 9/4406 |
| | | | 717/168 |
| 2004/0268340 A1* | 12/2004 | Steeb | G06F 8/60 |
| | | | 717/174 |
| 2005/0138347 A1* | 6/2005 | Haverkamp | G06F 8/65 |
| | | | 713/2 |
| 2005/0177829 A1* | 8/2005 | Vishwanath | G06F 8/61 |
| | | | 717/177 |
| 2005/0198629 A1* | 9/2005 | Vishwanath | G06F 8/61 |
| | | | 717/174 |
| 2005/0257206 A1* | 11/2005 | Semerdzhiev | G06F 8/65 |
| | | | 717/168 |
| 2005/0262501 A1 | 11/2005 | Marinelli et al. | |
| 2006/0048143 A1* | 3/2006 | Chao | G06F 9/4416 |
| | | | 717/177 |
| 2006/0080522 A1 | 4/2006 | Button et al. | |
| 2006/0089995 A1* | 4/2006 | Kerr | G06F 9/45558 |
| | | | 709/227 |
| 2006/0155735 A1* | 7/2006 | Traut | G06F 9/445 |
| 2006/0190933 A1* | 8/2006 | Tzeng | G06F 8/20 |
| | | | 717/140 |
| 2006/0218544 A1* | 9/2006 | Chakraborty | G06F 8/63 |
| | | | 717/168 |
| 2007/0074199 A1* | 3/2007 | Schoenberg | G06F 9/45533 |
| | | | 717/168 |
| 2007/0136721 A1 | 6/2007 | Dunshea et al. | |
| 2007/0150886 A1 | 6/2007 | Shapiro | |
| 2007/0168956 A1 | 7/2007 | Moore et al. | |
| 2007/0204263 A1 | 8/2007 | Nathan et al. | |
| 2007/0214348 A1* | 9/2007 | Danielsen | G06F 9/4416 |
| | | | 713/2 |
| 2007/0245334 A1 | 10/2007 | Nieh et al. | |
| 2007/0294578 A1 | 12/2007 | Qiao et al. | |
| 2007/0294676 A1* | 12/2007 | Mellor | G06F 21/57 |
| | | | 717/139 |
| 2008/0016387 A1* | 1/2008 | Bensinger | G06F 11/1451 |
| | | | 714/4.11 |
| 2008/0209413 A1* | 8/2008 | Kakumani | G06F 9/44521 |
| | | | 717/172 |
| 2008/0271017 A1* | 10/2008 | Herington | G06F 9/45558 |
| | | | 718/1 |
| 2009/0007105 A1* | 1/2009 | Fries | G06F 8/65 |
| | | | 718/1 |
| 2009/0106748 A1* | 4/2009 | Chess | G06F 9/455 |
| | | | 717/168 |
| 2009/0125902 A1* | 5/2009 | Ghosh | G06F 9/45533 |
| | | | 718/1 |
| 2009/0144538 A1* | 6/2009 | Duda | G06F 8/65 |
| | | | 713/2 |
| 2009/0172136 A1* | 7/2009 | Schulz | G06F 9/4416 |
| | | | 709/222 |
| 2009/0217255 A1* | 8/2009 | Troan | G06F 8/65 |
| | | | 717/168 |
| 2009/0228881 A1 | 9/2009 | Mukker et al. | |
| 2009/0241109 A1* | 9/2009 | Vandegrift | G06F 9/445 |
| | | | 718/1 |
| 2009/0276771 A1 | 11/2009 | Nickolov et al. | |
| 2009/0300151 A1* | 12/2009 | Friedman | G06F 11/3664 |
| | | | 718/1 |
| 2009/0300604 A1 | 12/2009 | Barringer | |
| 2010/0050169 A1 | 2/2010 | Dehaan | |
| 2010/0114825 A1* | 5/2010 | Siddegowda | G06F 8/71 |
| | | | 707/638 |
| 2010/0192143 A1* | 7/2010 | Ingle | G06F 8/63 |
| | | | 717/172 |
| 2010/0205587 A1 | 8/2010 | Dai et al. | |

(56) References Cited

U.S. PATENT DOCUMENTS

| | | |
|---|---|---|
| 2010/0242032 A1 | 9/2010 | Ladki et al. |
| 2010/0287544 A1* | 11/2010 | Bradfield ................ G06F 21/53 |
| | | 717/172 |
| 2010/0306377 A1 | 12/2010 | DeHaan et al. |
| 2011/0035754 A1* | 2/2011 | Srinivasan ............ G06F 9/4856 |
| | | 718/105 |
| 2011/0078293 A1 | 3/2011 | Phung et al. |
| 2011/0119474 A1 | 5/2011 | Singh et al. |
| 2011/0119678 A1* | 5/2011 | Filali-Adib ........... G06F 9/5077 |
| | | 718/105 |
| 2011/0125894 A1 | 5/2011 | Anderson et al. |
| 2011/0126197 A1 | 5/2011 | Larsen et al. |
| 2011/0126207 A1* | 5/2011 | Wipfel ................. H04L 9/3213 |
| | | 718/104 |
| 2011/0265076 A1* | 10/2011 | Thorat ...................... G06F 8/65 |
| | | 717/172 |
| 2011/0271270 A1* | 11/2011 | Bowen ...................... G06F 8/65 |
| | | 717/171 |
| 2011/0302572 A1 | 12/2011 | Kuncoro et al. |
| 2012/0144382 A1 | 6/2012 | Matthew et al. |
| 2012/0221612 A1* | 8/2012 | Zachariassen .... G06F 17/30067 |
| | | 707/827 |
| 2013/0318515 A1 | 11/2013 | Bowen |
| 2014/0053149 A1* | 2/2014 | Wu ............................ G06F 8/63 |
| | | 717/176 |
| 2014/0259006 A1* | 9/2014 | Tran .......................... G06F 8/65 |
| | | 717/173 |
| 2014/0359617 A1* | 12/2014 | Fontignie .................. G06F 8/65 |
| | | 718/1 |
| 2021/0224772 A1* | 7/2021 | Winsor ................ G06Q 20/202 |

OTHER PUBLICATIONS

"Amazon Elastic Compute Cloud—Developer Guide", Amazon Web Services LLC, (Nov. 30, 2009), 189 pgs.

"Amazon Elastic Compute Cloud—Getting Started Guide", Amazon Web Services LLC, (Nov. 30, 2009), 25 pgs.

Agarwalla, Bikash, et al., "Automating Provisioning of Complete Software Stack in a Grid Environment", College of Computing Technical Reports, (2004), 1-18.

Colp, Patrick, et al., "Breaking Up is Hard to Do: Security and Functionality in a Commodity Hypervisor", ACM, (2011), 189-202.

Domsch, Matt, et al., "Dynamic Kernel Module Support: From Theory to Practice", Proceedings of the Linux Symposium, (Jul. 21-24, 2004), 187-202.

Eriksen, Daniel, "The Linux Boot Process", Presentation for the Bruce Grey Linux Users Group, (Apr. 6, 2004), 8 pgs.

Haeberlen, Andreas, "A Case for the Accountable Cloud", ACM SIGOPS Operating Systems Review Archive, vol. 44, (Apr. 2010), 52-57.

Janson, Bruce, et al., "Soda: A File System for a Multicomputer", Proceedings of the 1st IEEE Computer Society International Workshop on Cluster Computing, (1999), 1-6.

Parpaillon, Jean, "OSCAR KerneiPicker: Handling Clients Kernels", IEEE, (2007), 1-7.

Rosen, Rami, "Building a Kernel Module for Many Distributions", Lightning Talks, (Jul. 2008), 1-16.

\* cited by examiner

SYSTEM AND METHOD FOR UPGRADING KERNELS IN CLOUD COMPUTING ENVIRONMENTS

CROSS-REFERENCE TO RELATED APPLICATIONS

This application is a continuation of U.S. patent application Ser. No. 13/959,146, filed on Aug. 5, 2013, which is a continuation of U.S. patent application Ser. No. 12/769,357, filed on Apr. 28, 2010 (which issued as U.S. Pat. No. 8,505,003 on Aug. 6, 2013), the content of each of which is hereby incorporated by reference in its entirety.

FIELD OF THE INVENTION

The invention relates to a system and method for upgrading kernels in cloud computing environments, and in particular, to deploying a virtual machine having a root file system, a kernel, and a ramdisk in a cloud computing environment, running executable code in the ramdisk that can identify an operating system release for the kernel, and dynamically injecting one or more modules that support the operating system release into the root file system in response to determining that the root file system lacks the modules that support the operating system release, whereby the kernel in the virtual machine may be upgraded, switched, or otherwise modified without having to recreate or rebuild the root file system.

BACKGROUND OF THE INVENTION

"Cloud computing" generally refers to computing that occurs in environments with dynamically scalable and often virtualized resources, which typically include networks that remotely provide services to client devices that interact with the remote services. For example, cloud computing environments often employ the concept of virtualization as a preferred paradigm for hosting workloads on any appropriate hardware. The cloud computing model has become increasingly viable for many enterprises for various reasons, including that the cloud infrastructure may permit information technology resources to be treated as utilities that can be automatically provisioned on demand, while also limiting the cost of services to actual resource consumption. Moreover, consumers of resources provided in cloud computing environments can leverage technologies that might otherwise be unavailable. Thus, as cloud computing and cloud storage become more pervasive, many enterprises will find that moving data center to cloud providers can yield economies of scale, among other advantages.

However, while much of the information technology industry moves toward cloud computing and virtualization environments, existing systems tend to fall short in adequately addressing concerns relating to managing or controlling workloads and storage in such environments. For example, cloud computing environments are generally designed to support generic business practices, meaning that individuals and organizations typically lack the ability to change many aspects of the platform. Moreover, concerns regarding performance, latency, reliability, and security present significant challenges, as outages and downtime can lead to lost business opportunities and decreased productivity, while the generic platform may present governance, risk, and compliance concerns. In other words, once organizations deploy workloads beyond the boundaries of their data centers, lack of visibility into the computing environment may result in significant management problems.

While these types of problems tend to be pervasive in cloud computing and virtualization environments due to the lack of transparency, existing systems for managing and controlling workloads that are physically deployed and/or locally deployed in home data centers tend to suffer from many similar problems. In particular, information technology has traditionally been managed in silos of automation, which are often disconnected from one another. For example, help desk systems typically involve a customer submitting a trouble ticket to a remedy system, with a human operator then using various tools to address the problem and close the ticket, while monitoring systems that watch the infrastructure to remediate problems may remain isolated from the interaction between the customer and the help desk despite such interaction being relevant to the monitoring system's function.

As such, because existing systems for managing infrastructure workloads operate within distinct silos that typically do not communicate with one another, context that has been exchanged between two entities can often be lost when the workload moves to the next step in the chain. When issues surrounding workload management are considered in the context of business objectives, wherein information technology processes and business issues collectively drive transitions from one silo to another, modern business tends to move at a speed that outpaces information technology's ability to serve business needs. Although emerging trends in virtualization, cloud computing, appliances, and other models for delivering services have the potential to allow information technology to catch up with the speed of business, many businesses lack the knowledge needed to intelligently implement these new technologies.

For example, emerging service delivery models often lead to deployed services being composed and aggregated in new and unexpected ways. In particular, rather than designing and modeling systems from the ground up, new functionality is often generated on-the-fly with complex building blocks that tend to include various services and applications that have traditionally been isolated and stand-alone. As such, even though many emerging service delivery models provide administrators and users with a wider range of information technology choices than have ever before been available, the diversity in technology often compounds business problems and increases the demand for an agile infrastructure. Thus, despite the advantages and promise that new service delivery models can offer businesses, existing systems tend to fall short in providing information technology tools that can inform businesses on how to intelligently implement an information technology infrastructure in a manner that best leverage available technology to suit the particular needs of a business.

Furthermore, although emerging service delivery models offer various ways to provide services that can be hosted in remote data centers, including virtualized or cloud computing environments, managing such services with existing systems tends to be a burdensome and cumbersome process. For example, existing systems typically host services in cloud computing environments within virtual machines that run over abstracted physical environments, wherein the virtual machines typically include a root file system (or "machine image") provided by an entity that deploys the service in the cloud computing environment in addition to a kernel and an initial ramdisk chosen from various modules available from a provider of the cloud computing environment (e.g., Amazon EC2). Thus, because the kernel included in the virtual machines typically needs certain modules to boot successfully, the root file system in the virtual machine typically requires certain modules that support the particular kernel chosen from the cloud computing provider. Consequently, upgrading the kernel contained in a virtual machine hosted in an existing cloud computing environment typically requires recreating or rebuilding the root file system to include the specific modules needed to support the upgraded kernel.

However, in many instances, recreating the root file system to include the specific modules needed to support the upgraded kernel can cause unnecessary downtime, lost productivity, or other negative consequences for services that the virtual machines provide. In particular, because updates to virtual machines that have been deployed in existing cloud computing environments are typically applied either during the boot process (i.e., subsequent to loading the kernel) or in an entirely new build of the master machine image, the virtual machine will either have to reload the kernel to incorporate the updates applied during the boot process or rebooted entirely with the new build of the master machine image. Although certain techniques have been proposed to load a new kernel in a running virtual machine instance, these techniques tend to fall short in adequately addressing security or stability concerns with switching the kernel in the running instances. For example, the kernel execution (or kexec) mechanism in the Linux kernel allows a new kernel to be loaded over a currently running kernel. However, kexec requires loading the new kernel on a booted virtual machine and then rebooting the virtual machine with the new kernel, which can leave a window of vulnerability prior to the reboot, especially in contexts where the original kernel has security issues. Furthermore, running kexec typically results in the new kernel overwriting memory for the current kernel even though that kernel may still be running, which can cause substantial stability concerns prior to the reboot.

Accordingly, in view of the foregoing, existing systems tend to lack mechanisms that can suitably upgrade, switch, or otherwise modify the kernels in existing virtual machines running in cloud computing environments without compromising security, stability, or other concerns.

SUMMARY OF THE INVENTION

According to one aspect of the invention, the system and method described herein may provide various features for upgrading kernels in virtual machines deployed in cloud computing environments. In particular, the system and method described herein may deploy a virtual machine having a root file system (or "machine image"), a kernel, and an initial ramdisk (e.g., an initrd process) in a cloud computing environment. For example, in one implementation, the root file system may generally include a directory hierarchy containing various files that run within a user space for the virtual machine (e.g., files for an operating system release, various applications, etc.), the kernel may generally bundle various hardware drivers matched to physical resources that host the virtual machine in the cloud computing environment, and the initial ramdisk may generally include a temporary file system containing various files that run during a boot process for the kernel to prepare the virtual machine prior to mounting the root file system. Furthermore, in one implementation, the system and method described herein may configure the initial ramdisk code to contain code that can analyze the kernel in a booted virtual machine to identify an operating system release (or version) associated with the kernel. The code in the initial ramdisk may then determine whether the directory hierarchy in the root file system contains one or more modules necessary to run the identified operating system release, and in response to determining that the root file system lacks the modules necessary to run the operating system release, the initial ramdisk may then retrieve the necessary modules from a trusted repository and inject the modules into the root file system. Thus, the code in the configured initial ramdisk may upgrade, switch, or otherwise modify the kernel in the virtual machine without having to recreate or rebuild the root file system (i.e., the root file system may be dynamically modified to include the modules needed to support the upgraded kernel).

According to one aspect of the invention, the system and method for upgrading kernels in cloud computing environments described herein may upgrade the kernel in a particular cloud image in a non-disruptive manner (i.e., the kernel may be upgraded without having to rebuild a machine image that provides a root file system containing a directory hierarchy for the cloud image). In one implementation, the cloud computing environment may be provided by any suitable entity that offers services for hosting cloud images (e.g., Amazon EC2, Eucalyptus Public Cloud, etc.). As such, the cloud computing environment may include various criteria for the cloud image, which the provider of the cloud computing environment may establish. For example, the criteria established by the cloud computing environment provider may specify that the cloud image may contain a machine image (or root file system) that a user can supply, while the kernel in the cloud image can be selected from various kernels available from the provider or trusted vendors. In addition, the cloud image may include a ramdisk containing various drivers and other software that supports the kernel, while the machine image generally contains one or more modules that the kernel needs to successfully boot and run in the cloud computing environment.

According to one aspect of the invention, to upgrade or otherwise modify the kernel in the cloud image, a cloud kernel upgrade system may ensure that the machine image contains the modules that the modified kernel needs to successfully boot and run in the cloud computing environment. For example, the cloud kernel upgrade system may pre-configure the ramdisk to provide functionality that can dynamically update the machine image to support any kernel that may be chosen for the cloud image. More particularly, the pre-configured ramdisk may include a temporary file system containing executable code that can compare the kernel booted in the cloud image to the root file system to verify whether the machine image contains a directory hierarchy that matches an operating system release (or version) for the booted kernel. Thus, in response to the machine image containing the directory hierarchy matching the operating system release, the ramdisk may mount the root file system and boot the root file system in a user space for execution in the cloud computing environment. Alternatively, in response to determining that the machine image does not contain the directory hierarchy matching the operating system release, the ramdisk may create the directory hierarchy in the machine image and inject the modules needed to support the booted kernel into the root file system prior to mounting and delivering control to the root file system (e.g., the ramdisk may retrieve the kernel modules injected into the root file system from a trusted repository).

According to one aspect of the invention, the pre-configured ramdisk may execute a uname system call to determine one or more key attributes that describe the operating system release associated with the booted kernel. As such, in response to determining the key attributes describing the operating system release, the ramdisk may check whether the root file system contains the directory hierarchy with the modules that match the operating system release. Furthermore, in one implementation, in response to determining that the root file system contains the directory hierarchy with the modules that match the operating system release, the ramdisk may further determine whether the booted kernel has a known vermagic string that describes an environment used to build the kernel. Thus, in response to suitably obtaining the vermagic string that describes the environment used to build the kernel, the ramdisk may further validate whether the modules in the directory hierarchy properly match the build environment for the booted kernel. Consequently, the ramdisk may discover situations where the booted kernel has an operating system release string matching the directory hierarchy in the root file system but actually runs on a different kernel architecture (e.g., the directory hierarchy in the machine image may include modules built for a thirty-two bit kernel although the booted kernel actually provides a sixty-four bit architecture). Thus, in response to determining that the modules in the matching directory hierarchy do not properly match the build environment that the booted kernel actually runs, the ramdisk may contact the trusted repository to retrieve one or more modules that properly match the build environment that the booted kernel actually runs and replace the modules in the matching directory hierarchy with the modules retrieved from the trusted repository.

According to one aspect of the invention, the system and method described herein may manage the machine image independently from the ramdisk and the kernel to enable the ramdisk to dynamically inject the modules that support the booted kernel or any other suitable content into the root file system. For example, in one implementation, the cloud image may further include a hypervisor that allows (or even requires) the kernel and the ramdisk to be independent from the machine image. In particular, because cloud computing environment providers often limit available choices for the kernel that the cloud image includes, whereas a user may customize the machine image, the pre-configured ramdisk may provide functionality that can upgrade the kernel without having to recreate or rebuild the machine image. Thus, the hypervisor may manage the machine image independently from the ramdisk and the kernel to enable the kernel to be changed without the knowledge of the machine image, and further to enable the ramdisk to modify the machine image without requiring corresponding changes to the ramdisk. For example, in one implementation, the hypervisor may run code in the pre-configured ramdisk at a root level, whereby the ramdisk may be provided with permissions to inject any suitable content into the machine image, including any modules needed to support a modification to the kernel, any management agents that can manage a lifecycle for the cloud image, executable scripts or other programs that can be executed in and then removed from the cloud image (including any runtime state or other temporary changes that the scripts or other programs apply to the cloud image), or any other suitable content.

According to one aspect of the invention, the system and method described herein may further include a policy engine and an identity engine that can communicate with the ramdisk to manage the cloud image. For example, as noted above, the ramdisk may dynamically embed management agents within the cloud image to control and track activity that occurs in or with the cloud image (e.g., verifying that the cloud image complies with any relevant policies or access controls, restricting any activity that does not comply with the relevant policies or access controls, etc.). Further, because the management agents embedded in the cloud image can control, track, and monitor activity for the cloud image in the cloud computing environment, the monitored activity may be provided to the policy engine and/or the identity engine to provide an audit trail that can be referenced to remediate the activity that occurs in or with the cloud image (e.g., in response to detecting or receiving notice of any problems with the cloud image, to provide compliance assurance for the monitored activity, etc.). Thus, the policy engine and the identity engine may communicate with the ramdisk to coordinate injecting the management agents into the cloud image and to further coordinate subsequently removing the management agents from the cloud image, as appropriate.

Other objects and advantages of the invention will be apparent to those skilled in the art based on the following drawings and detailed description.

BRIEF DESCRIPTION OF THE DRAWINGS

FIG. 1A illustrates an exemplary service distribution that can be provided in a virtual machine hosted in a cloud computing environment, while

DETAILED DESCRIPTION

According to one aspect of the invention, the system and method described herein may provide various features for upgrading kernels in virtual machines deployed in cloud computing environments. In particular, the system and method described herein may deploy a virtual machine having a root file system (or "machine image"), a kernel, and an initial ramdisk (e.g., an initrd process) in a cloud computing environment. For example, in one implementation, the root file system may generally include a directory hierarchy containing various files that run within a user space for the virtual machine (e.g., files for an operating system release, various applications, etc.), the kernel may generally bundle various hardware drivers matched to physical resources that host the virtual machine in the cloud computing environment, and the initial ramdisk may generally include a temporary file system containing various files that run during a boot process for the kernel to prepare the virtual machine prior to mounting the root file system. Furthermore, in one implementation, the system and method described herein may configure the initial ramdisk code to contain that can analyze the kernel in a booted virtual machine to identify an operating system release (or version) associated with the kernel. The code in the initial ramdisk may then determine whether the directory hierarchy in the root file system contains one or more modules necessary to run the identified operating system release, and in response to determining that the root file system lacks the modules necessary to run the operating system release, the initial ramdisk may then retrieve the necessary modules from a trusted repository and inject the modules into the root file system. Thus, the code in the configured initial ramdisk may upgrade, switch, or otherwise modify the kernel in the virtual machine without recreating or rebuilding the root file system (i.e., the root file system may be dynamically modified to include the modules needed to support the upgraded kernel).

Figure 1A:
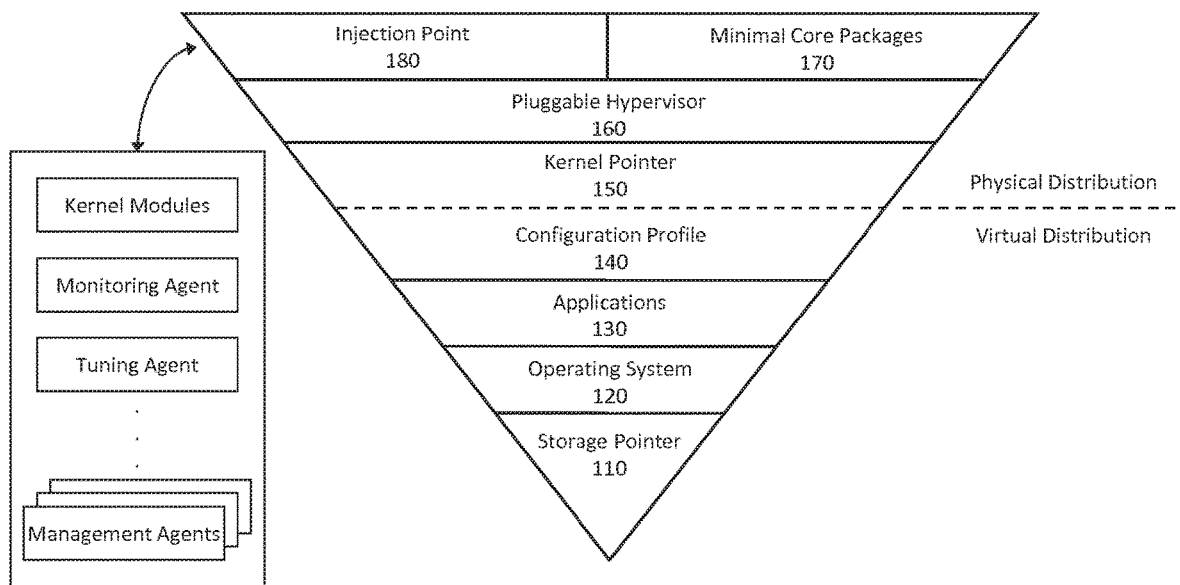
Figure 1B:
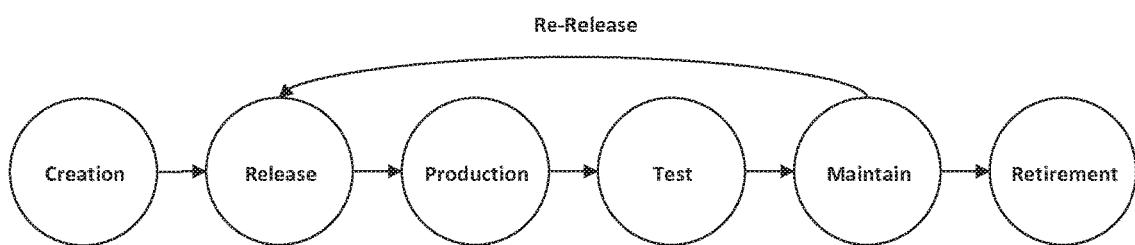
FIG. 1B illustrates an exemplary management lifecycle for the service distribution shown in FIG. 1A, according to one aspect of the invention.

According to one aspect of the invention, FIG. 1A illustrates an exemplary service distribution 100A that can be provided in a virtual machine hosted in a cloud computing environment, while FIG. 1B illustrates an exemplary management lifecycle 100B for the service distribution shown in FIG. 1A. In one implementation, the service distribution shown in FIG. 1A may be created in a workload management system, which may provide various orchestrated virtualization services that can create and manage a partitioned operating environment for the service distribution 100A. For example, the operating environment for the service distribution 100A may be partitioned into a physical distribution layer, which may abstract various physical resources that host the service distribution 100A, and a virtual distribution layer, which may include one or more packages, patterns, or other software components that configure the service distribution 100A to provide one or more specific applications or services. As such, in one implementation, the physical distribution layer and the virtual distribution layer may generally define a standardized partitioning model that can permit the service distribution 100A to run in any suitable cloud computing environment or other data center (e.g., as described in further detail in co-pending U.S. patent application Ser. No. 12/725,241, entitled "System and Method for Intelligent Workload Management," filed on Mar. 16, 2010, the contents of which are hereby incorporated by reference in entirety). For example, the cloud computing environment may generally include any suitable public cloud computing environment available over public or unrestricted networks or private cloud computing environment available over private or restricted networks, or any suitable combination thereof. As such, any description referring to the "cloud" or the "cloud computing environment" provided herein will be understood to refer to any suitable data center that provides a virtualized or cloud data center, including public and/or private cloud computing environments, whether or not explicitly described.

In one implementation, the physical distribution layer in the service distribution 100A may generally provide an interface to various physical resources that host the service distribution 100A in a particular cloud computing environment. In particular, the physical distribution layer may include a kernel pointer 150 that identifies a particular kernel available from a provider of the cloud computing environment (e.g., Xen, RedHat, Canonical, Microsoft, etc.), wherein the kernel may bundle various hardware drivers matched to the physical resources that host the service distribution 100A in the cloud computing environment (e.g., local area network drivers, independent hardware vendor drivers, variable drivers that support certain hardware platforms, etc.). Thus, the kernel pointer 150 may generally provide an interface between any software components in the service distribution 100A and the physical resources that host the service distribution 100A. For example, the Amazon Elastic Compute Cloud (EC2) provides various kernels that can be selected and bundled with a particular service distribution 100A, whereby the kernel pointer 150 may identify one of the selectable kernels to provide the interface between the software components in the service distribution 100A and the physical resources that host the service distribution 100A (e.g., as described in further detail in "Amazon Elastic Compute Cloud Developers Guide," the contents of which are hereby incorporated by reference in entirety).

In one implementation, the physical distribution layer may further include a pluggable hypervisor 160 that enables the service distribution 100A to concurrently run various different operating systems 120 over the hosting physical resources and minimal core packages 170 that support any functionality associated with the components in the physical distribution layer. In particular, the pluggable hypervisor 160 may maintain separation between the kernel identified in the kernel pointer 150 and a ramdisk that runs during a boot process for the kernel to prepare the service distribution 100A to be mounted in the cloud computing environment. For example, to prepare the service distribution 100A, the ramdisk may identify a location for a root file system that contains an operating system 120, applications 130, or other software for the service distribution 100A, which may be used to retrieve any hardware drivers or other modules needed to support the booted kernel identified in the kernel pointer 150. In addition, the physical distribution layer may further include an injection point 180 for dynamically inserting and removing any suitable content that can manage the lifecycle 100B for the service distribution 100A. For example, as will be described in further detail below, the kernel pointer 150 may be updated to switch, upgrade, or otherwise modify the kernel selected for the service distribution 100A, whereby the ramdisk may dynamically insert within the service distribution 100A any hardware drivers or other modules needed to support the modified kernel at the injection point 180.

In one implementation, the virtual distribution layer in the service distribution 100A may provide a tuned appliance, which the physical distribution layer may execute over the underlying physical resources that host the service distribution 100A in the cloud computing environment. In particular, the virtual distribution layer may include a storage pointer 110 that identifies one or more local or remote storage resources allocated to maintain a persistent state for the service distribution 100A (e.g., in a clustered and/or replicated file system that the provider of the cloud computing environment maintains). In addition, the operating system 120 in the virtual distribution layer may include various packages, patterns, or other software components that support any applications 130 in the tuned appliance, whereby the operating system 120 may provide "just enough operating system" (JeOS) 120 to support the service distribution 100A. In one implementation, the virtual distribution layer may further include a configuration profile 140 that can be used to configure the storage pointer 110, the operating system 120, the applications 130, the kernel pointer 150, or any other suitable aspect of the service distribution 100A. For example, the configuration profile 140 may bundle various virtual drivers that can tune components in the service distribution 100A, tokens that define unique identities and authentication credentials for the service distribution 100A, and a service level declaration that defines any memory, processing, availability, disaster recovery, or other deployment constraints for the service distribution 100A, among other things.

Thus, the components in the virtual distribution layer may be maintained or otherwise managed neutrally from the physical distribution layer, which may enable independent management for any suitable component in the service distribution 100A. In particular, the physical distribution layer and/or the virtual distribution layer may be created in any suitable image format that encapsulates the service distribution 100A within one or more metadata wrappers (e.g., an Amazon Machine Image format). As such, kernel modules, a monitoring agent, a tuning agent, one or more management agents, or any other suitable content may be dynamically inserted within or removed from the service distribution 100A to manage the lifecycle 100B for the service distribution 100A. For example, in response to initially creating the service distribution 100A, the lifecycle 100B of the service distribution 100A may enter the creation mode, wherein a creation management agent may execute a bootstrap process to advertise that the service distribution 100A exists and appropriately download any additional content needed to manage the various modes of the service distribution lifecycle 100B.

For example, in one implementation, the lifecycle 100B may change from one mode to another in response to modifying the kernel pointer 150 to switch to a different kernel (e.g., from the maintain mode to an optional re-release mode). As such, in response to determining that the kernel pointer 150 has been modified, the ramdisk may execute a unix name (uname) system call to determine a release (or version) for the operating system that the modified kernel supports, wherein the ramdisk may then determine one or more key attributes needed to match the operating system release. In one implementation, the ramdisk may then determine whether the root file system in the service distribution 100A contains a directory hierarchy that corresponds to the operating system release (i.e., to verify whether the root file system contains one or more modules needed to support the modified kernel). Thus, in response to determining that the root file system does not contain the directory hierarchy corresponding to the operating system release, the ramdisk may retrieve the modules needed to support the modified kernel from a trusted repository and dynamically inject the modules into the service distribution 100A at the injection point 180. In a similar manner, the injection point 180 may be employed to manage any suitable mode in the service distribution 100B lifecycle. In particular, content for managing a current mode in the service distribution lifecycle 100B may be identified and dynamically inserted into the service distribution 100A at the injection point 180 to manage the current mode, and the content may then be removed from the service distribution 100A in response to suitably completing any management tasks associated with the current mode in the lifecycle 100B, including any runtime state or other changes applied to the service distribution 100A in order to perform the management tasks (e.g., a testing agent inserted into the service distribution 100A during the test mode may disable a YaST configuration tool that controls installation and system management for the virtual distribution layer, whereby the YaST configuration tool may be re-enabled in response to removing the testing agent once the management tasks for the test mode have completed).

Thus, removing the runtime state associated with the content inserted at the injection point 180 and any changes that the content applies to the service distribution 100A during the various modes in the lifecycle 100B may ensure that the service distribution 100A has been restored to a "golden" or "pristine" state prior to entering a next lifecycle mode. In particular, the management content may be dynamically inserted into the service distribution 100A to execute appropriate management tasks for a current lifecycle mode, and then appropriately removed in a manner that leaves the service distribution 100A unmodified except for any persistent changes that the management tasks apply to the service distribution 100A. For example, during the maintenance mode, a configuration agent may be inserted into the service distribution 100A to modify the storage pointer 110 to point to a new local or remote storage location because an original storage location may be failing or running short on storage, whereby the service distribution 100A may be left unchanged except for the modified storage pointer 110. In another example, a tuning agent may be similarly inserted into the service distribution 100A during the maintenance mode to modify the kernel pointer 150 to upgrade the current kernel for the service distribution 100A, wherein the ramdisk may then verify that the root file system contains any modules needed to support the upgraded kernel.

Thus, as described in further detail above, the injection point 180 may provide control for managing various different modes that occur during the service distribution lifecycle 100B, including a creation mode that initially creates the service distribution 100A, a release mode that delivers the service distribution 100A to suitable entities that will host the service distribution 100A (e.g., the cloud computing environment), a production mode that deploys the service distribution 100A to entities that will interact with the service distribution 100A, a test mode that validates whether or not that the service distribution 100A functions correctly, a maintenance mode that debugs, patches, or otherwise updates the service distribution 100A (including the kernel referenced in the kernel pointer 150), an optional re-release mode that delivers subsequent versions of the service distribution 100A with any changes applied during the production, test, or maintenance modes, and an eventual retirement mode that de-provisions any existing instances of the service distribution 100A (e.g., in response to the service distribution 100A becoming outdated or obsolete).

Figure 2:
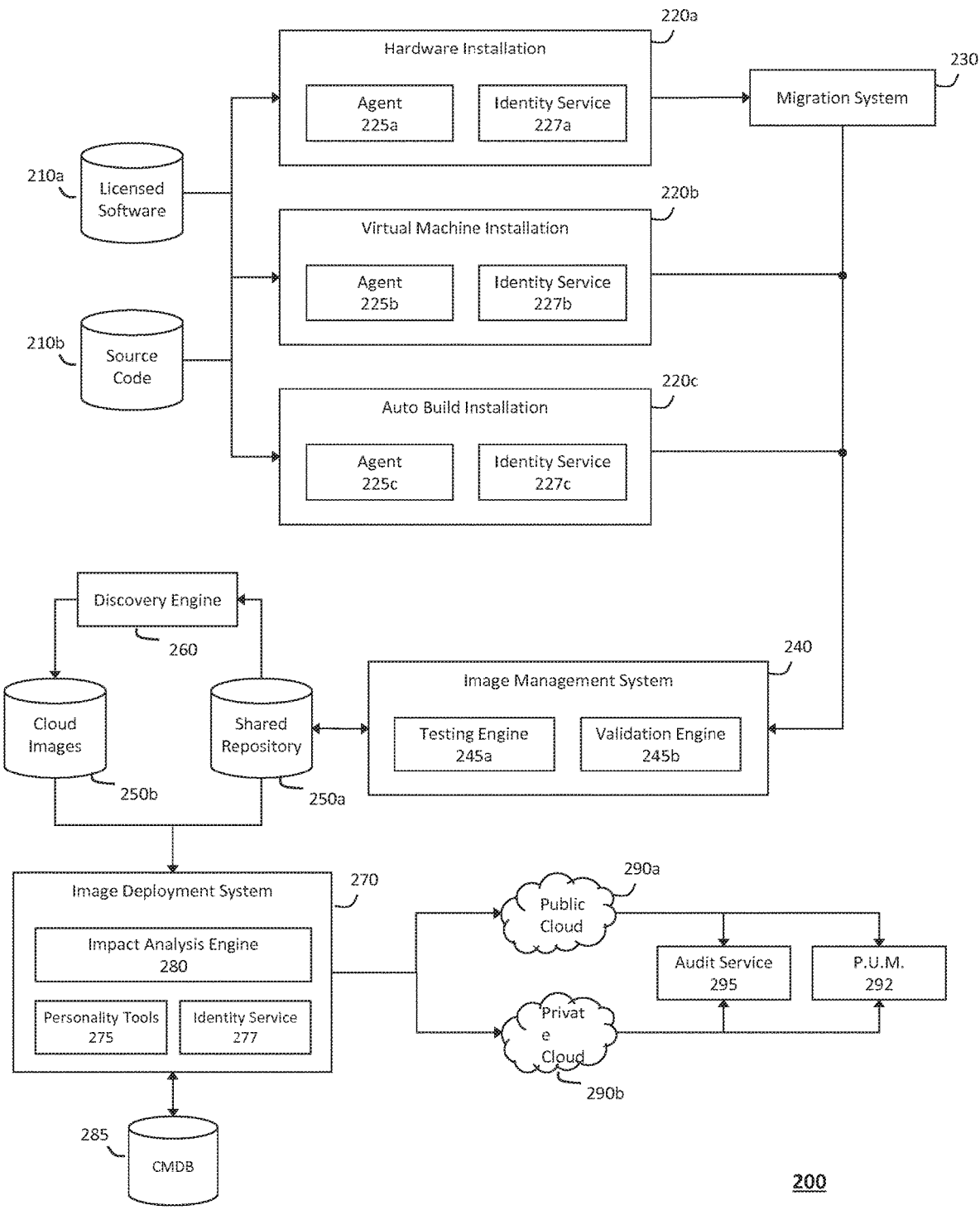
FIG. 2 illustrates an exemplary system for controlling virtual machines hosted in cloud computing environments, according to one aspect of the invention.

According to one aspect of the invention, FIG. 2 illustrates an exemplary system 200 for controlling virtual machines hosted in cloud computing environments. In particular, cloud computing environments generally include various dynamically allocated resources that can have unpredictable characteristics, whereby the system 200 may coordinate such dynamically allocated resources in a closed-loop management infrastructure that can manage declarative policies, fine-grained access controls, and orchestrated management and monitoring tools. For example, in one implementation, the system 200 may operate in a workload management system that provides various mechanisms for automatically creating images that can be deployed to a public cloud computing environment 290a available over public or unrestricted network, and which can further be deployed to a private cloud computing environment 290b deployed locally within private or restricted networks (e.g., as described in co-pending U.S. patent application Ser. No. 12/645,114, entitled "System and Method for Controlling Cloud and Virtualized Data Centers in an Intelligent Workload Management System," filed Dec. 22, 2009, the contents of which are hereby incorporated by reference in entirety). In addition, the system 200 may be used to install software contained in licensed software repositories 210a, source code repositories 210b, or other suitable software sources onto any images that have been deployed to the public cloud 290a or the private cloud 290b, control and audit activity that occurs in the images deployed to the public cloud 290a or the private cloud 290b, establish and retrieve network addresses (e.g., IP addresses, DHCP addresses, etc.) for cloned images across various operating platforms (e.g., Windows platforms, Linux platforms, etc.), and analyze any impact that the activity occurring in the images deployed to the public cloud 290a or the private cloud 290b may have on other machines or images.

As such, the system 200 shown in FIG. 2 and described herein may generally include various features that can provide predictability in controlling images, virtual machines, or other resources that have been deployed to the public cloud 290a and/or the private cloud 290b. In particular, in one implementation, the system 200 may include a licensed software repository 210a that contains licensed software, a source code repository 210h that contains software source code, or any other suitable software repository. In one implementation, the licensed software in the licensed software repository 210a, the software source code in the source code repository 210b, or other software may then installed over suitable hardware resources to create one or more hardware installations 220a, installed on a virtual machine to create one or more virtual machine installations 220b, and/or built within a suitable build system to create one or more auto build installations 220c. In one implementation, in response to installing or otherwise creating the hardware installations 220a, the virtual machine installations 220b, and the auto build installations 220c, an appropriate management agent 225 may be inserted into the installation 220. In particular, the management agent 225 may provide functionality for performing various tasks to manage the licensed software, source code, or other software included in the installations 220. For example, in one implementation, the tasks performed by the management agents 225 may include retrieving DHCP addresses, establishing static IP addresses, providing remote debugging assistance, and inserting one or more personality tools 275 (e.g., privileged user management) for the installations 220.

In one implementation, the hardware installations 220a, virtual machine installations 220b, and auto build installations 220c may each further include a respective identity service 227 that provides a unique identity for the respective installations 220. For example, in one implementation, the identity services 227 may generally include authentication tokens that define one or more federated authorizations or permissions for the respective installations 220 (e.g., across a plurality of authentication domains). As such, the management agents 225 inserted into the various software installations 220 may interact with the identity services 227 that define the authorizations or permissions for the various software installations 220 to uniquely identify and manage the various installations 220. For example, in addition to defining the authorizations or permissions for the various installations 220, the identity services 227 may further identify versions, builds, or other information that can uniquely identify the licensed software, source code, or other software included in the installation, which may enable management for such licensed software, source code, or other software (e.g., in response to detecting updates to the licensed software, source code, or other software in the licensed software repository 210a or the source code repository 210b, the integrated identity services 227 may be referenced to identify and appropriately update any installations 220 that may have been created from the updated software).

In one implementation, in response to creating the various software installations 220 and embedding the suitable management agents 225a and identity services 227, various operational images may be created from the software installations 220. In particular, the virtual machine installations 220b and the auto build installations 220c may generally include one or more virtual machine images, while the hardware installations 220a may generally include software that executes directly over underlying hardware resources. The operational images created from the virtual machine installations 220b and the auto build installations 220c may therefore include the virtual machine images included therein, wherein the operational virtual machine images may be provided to an image management system 240 that stores the operational virtual machine images in a shared repository 250a (e.g., an image repository). With respect to the hardware installations 220a that include software executing directly over underlying hardware resources rather than virtual machine images, a migration system 230 may provide functionality that can create a suitable operational virtual machine image from the hardware installations 220a. The migration system 230 may evaluate any licensed software, source code, packages, or other software included in the hardware installations 220a and create operational virtual machine images that can run in a virtualized environment. For example, in one implementation, the migration system 230 may include a Novell PlateSpin Migrate system 230, a VMware vCenter Converter system 230, or any other suitable migration system 230 that provides conversion or migration services between physical and virtual platforms. The operational virtual machine image created from the hardware installation 220a may then be provided to the image management system 240, which may store the operational virtual machine image in the shared repository 250a in a similar manner as the virtual machine installations 220b and the auto build installations 220c.

In one implementation, in response to providing the operational images created from the hardware installations 220a, the virtual machine installations 220b, and the auto build installations 220c to the image management system 240, the image management system 240 may automatically store the operational images in the shared repository 250a in response to determining that the operational images do not need to be tested for operational integrity (e.g., because the operational images include an attestation token indicating that the operational images have already passed operational integrity tests). Alternatively, the image management system 240 may optionally invoke a testing engine 245a that performs one or more operational integrity tests for the operational images prior to storing the operational images in the shared repository 250a. For example, the operational integrity tests performed by the testing engine 245a may test the operational images against various test scripts designed to verify integrity for the operational images (e.g., validating checksums, installer functionality, etc.). Thus, in response to the testing engine 245a determining that one or more of the operational images have passed the operational integrity tests, such operational images may be released to the shared repository 250a. Alternatively, in response to the testing engine 245a determining that one or more of the operational images did not pass the operational integrity tests, the image management system 240 may invoke a validation engine 245b that supervises debugging and revalidation for such operational images (e.g., generating a validation workload to coordinate collaborative interaction among various entities that debug and revalidate the operational images until the operational images eventually pass the operational integrity tests). The validation engine 245b may then re-invoke the testing engine 245a to determine whether the operational images have been debugged or otherwise revalidated in a manner that results in the operational images passing the integrity tests, wherein the operational images may be released to the shared repository 250a in response to passing the integrity tests or prevented from such release in response to not passing the integrity tests.

In one implementation, the system 200 may further include a discovery engine 260 that continually monitors the shared repository 250a to detect whether one or more operational images have been newly added to the shared repository 250a. Further, in one implementation, the image management system 240, the shared repository 250a, or another suitable component in the system 200 may generate an event in response to one or more operational images being added to the shared repository 250a, wherein the event may notify or otherwise advertise the new operational images to the discovery engine 260. In one implementation, in response to the discovery engine 260 detecting the new operational images in the shared repository 250a or receiving the event notifying or advertising the new operational images in the shared repository 250a, the discovery engine 260 may prepare the operational images for deployment to the public cloud 290a or the private cloud 290b. In particular, various public clouds 290a and private clouds 290b may support different image formats, wherein the discovery engine 260 may convert the operational images into the appropriate image format for the public cloud 290a or private cloud 290b where the operational images will be deployed. For example, in a context where an operational image will be deployed to an Amazon EC2 public cloud 290a, the discovery engine 260 may convert the operational image into an Amazon Machine Image (AMI) format used in the Amazon EC2 public cloud 290a. Thus, the cloud image repository 250b may contain various cloud images created from the operational images in the shared repository 250a, wherein the various cloud images may be in various different formats depending on the image format for the public cloud 290a or private cloud 290b that will host the cloud images.

In one implementation, in response to storing the cloud images in the cloud image repository 250b, an image deployment system 270 may be invoked to deploy the cloud images to the appropriate public cloud 290a or private cloud 290b. In one implementation, prior to deploying the cloud images to the appropriate public cloud 290a or private cloud 290b, the image deployment system 270 may invoke an impact analysis engine 280 that determines a potential impact of deploying the cloud images to the public cloud 290a or private cloud 290b. In particular, deploying the cloud images to the public cloud 290a or private cloud 290b may generally include various deployment processes (e.g., starting, stopping, cloning, or migrating the cloud images). Thus, the impact analysis engine 270 may reference a configuration management database 285 to validate whether the cloud images can be suitably deployed to the public cloud 290a or the private cloud 290b. For example, the impact analysis engine 270 may reference the configuration management database 285 to verify that other resources detailed in the configuration management database 285 will not be adversely affected by deploying the cloud images (e.g., because the deployment may require substantial bandwidth during a period of peak network traffic). Furthermore, the impact analysis engine 270 may communicate with an audit service 295, a privileged user management service 292, or other monitoring services provided in the public cloud 290a or the private cloud 290b to enhance the impact analysis (e.g., determining whether conditions in the public cloud 290a or private cloud 290b may have adverse impacts on the deployment, local infrastructure resources, etc.).

In one implementation, in response to the impact analysis engine 270 determining that deploying the cloud images does not raise potential adverse impacts, or alternatively in response to resolving any such potential adverse impacts, the image deployment system 270 may deploy the cloud images in the cloud image repository 250b to the appropriate public cloud 290a or private cloud 290b. Further, in one implementation, the operational images in the shared repository 250a may already be appropriate for deployment into the public cloud 290a or private cloud 290b without requiring conversion to a cloud image format, in which case the image deployment system 270 may similarly deploy the operational images in the shared repository 250a to the public cloud 290a or private cloud 290b. In one implementation, to deploy the cloud images or operational images to the public cloud 290a or private cloud 290b, the image deployment system 270 may clone or modify the cloud images or operational images (e.g., to preserve an original version of the cloud images or operational images prior to the cloud deployment). As such, in response to cloning or modifying the images prior to the cloud deployment, the image deployment system 270 may inject a new or aggregated identity service 277 into the cloned or modified images, wherein the new or aggregated identity service 277 may provide a record that identifies a lineage, pedigree, or other relationships for the cloned or modified images. Furthermore, the image deployment system 270 may inject one or more personality tools 275 into the cloned or modified images in response to determining that the personality tools 275 have not already been injected (e.g., during creation of the original software installations 220). For example, as noted above, the personality tools 275 may generally include tools for privileged user management, remote debugging, or customizing base images (e.g., certain scripts may be applied to a Linux base image in order to customize the base image for particular functions that the image provides).

In one implementation, the image deployment system 270 may then deploy the cloud images or the operational images to the appropriate public cloud 290a or private cloud 290b, wherein the deployed images may be managed in the public cloud 290a and the private cloud 290b. For example, as noted above, the images may include embedded management agents 225 that can control and track any activity associated with the deployed images through interaction with the embedded identity services 227, including verifying that the images comply with any relevant policies or restricting any activity that may not comply with the relevant policies. Further, because the management agents 225, identity services 227 (and/or 277), and personality tools 275 embedded in the images can control, track, and monitor activities for the images that have been deployed to the public cloud 290a and the private cloud 290b, the monitored activity may be provided to an audit service 295 that can remediate the activity in response to any problems with the images, provide compliance assurance for the activity associated with the images, or otherwise analyze activity that occurs in the images following deployment to the public cloud 290a or the private cloud 290b. Similarly, the embedded identity services 227 (and/or 277) may interact with a privileged user management service 292 in the public cloud 290a or the private cloud 290b, wherein the privileged user management service 292 and the audit service 295 may cooperate in various ways to remediate, assure compliance, or otherwise analyze the activity that occurs in the images following deployment to the public cloud 290a or the private cloud 290b.

Figure 3:
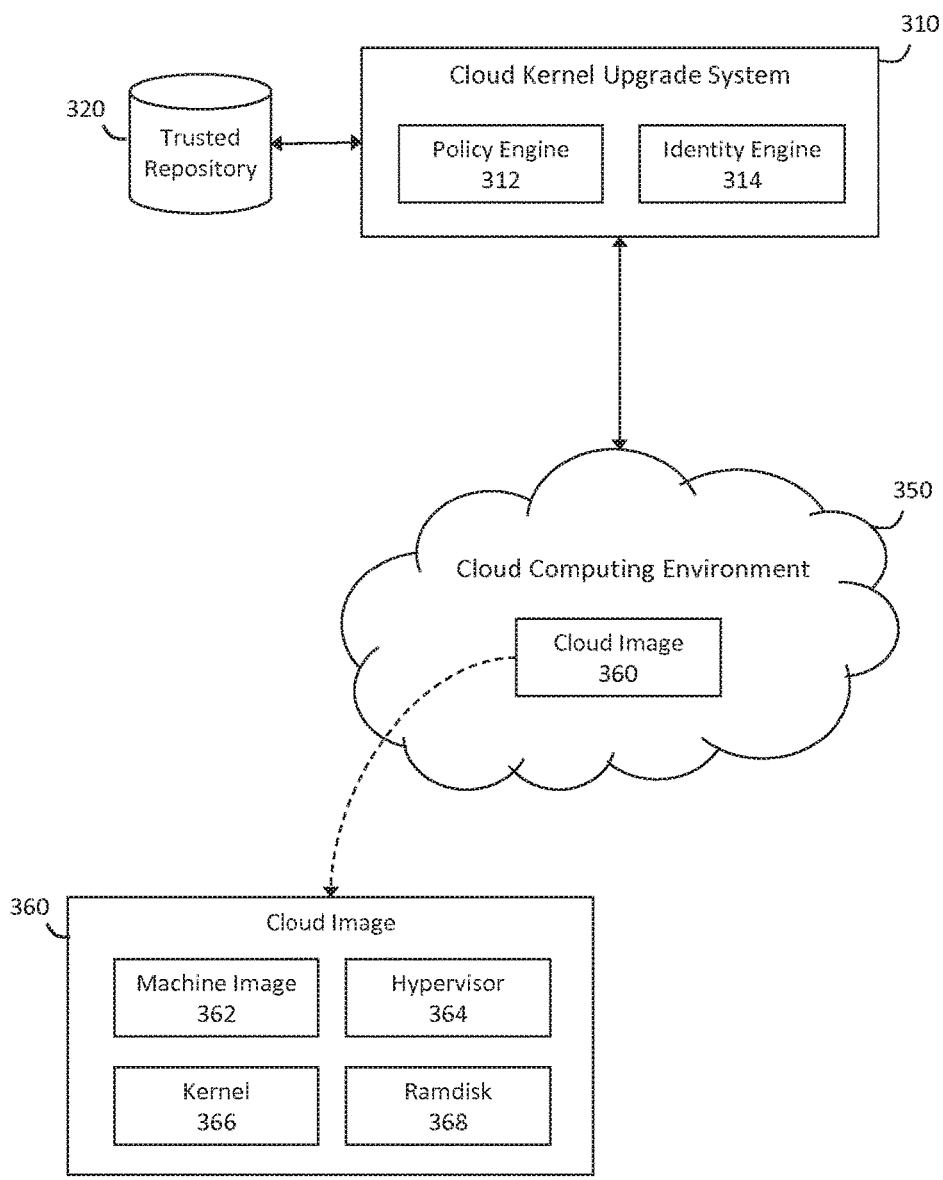
FIG. 3 illustrates an exemplary system for upgrading kernels in virtual machines hosted in clouding computing environments, according to one aspect of the invention.

According to one aspect of the invention, FIG. 3 illustrates an exemplary system 300 for upgrading a kernel 366 in a cloud image 360 hosted in a cloud computing environment 350. In particular, as will be described in further herein, the system 300 shown in FIG. 3 may provide various features that can upgrade the kernel 366 in the cloud image 360 in a non-disruptive manner (i.e., the kernel 366 may be upgraded without having to rebuild a machine image 362 having a root file system that contains a directory hierarchy for the cloud image 360). In one implementation, the cloud computing environment 350 shown in FIG. 3 may be provided by any suitable entity that offers services for hosting cloud images 360 (e.g., Amazon EC2, Eucalyptus Public Cloud, providers that offer interfaces based on QEMU, etc.). As such, the cloud computing environment 350 may include various criteria for the cloud image 360, which the provider of the cloud computing environment 350 typically establishes. For example, the criteria established by the provider of the cloud computing environment 350 may provide that the cloud image 360 can contain the root file system in a machine image 362 that user supplies, or the provider of the cloud computing environment 350 may provide various machine images 362 that can be selected to provide certain functionality for the cloud image 360 (e.g., machine images 362 that provide functionality for Linux, Apache, or other web servers, Hadoop nodes, etc.).

In one implementation, the criteria established by the provider of the cloud computing environment 350 may further provide that the kernel 366 in the cloud image 366 can be selected from various kernels available from the provider or trusted vendors and a ramdisk 368 containing various drivers and other software that supports the kernel 366 (e.g., Xen drivers, video drivers, etc.). Furthermore, in one implementation, the machine image 362 may contain one or more modules that the kernel 366 needs to successfully boot and run in the cloud computing environment 350. As such, to upgrade or otherwise modify the kernel 366 in the cloud image 360, the system 300 may include a cloud kernel upgrade system 310 that can ensure that the machine image 362 contains one or more modules that the modified kernel 366 needs to successfully boot and run in the cloud computing environment 350. For example, whereas existing systems typically recreate the machine image 362 to include the modules necessary for the modified kernel 366, the cloud kernel upgrade system 310 may pre-configure the ramdisk 368 to provide functionality that can dynamically update the machine image 362 to support any kernel 366 chosen for the cloud image 360. More particularly, the pre-configured ramdisk 368 may generally include a temporary file system containing executable code that can compare the kernel 366 that has booted in the cloud image 360 with the modules in the root file system associated with the machine image 362 in order to verify that the machine image 362 supports the booted kernel 366, or alternatively to dynamically update the machine image 362 to support the booted kernel 366.

For example, in one implementation, the ramdisk 368 may execute a uname system call to determine one or more key attributes that describe a release (or version) associated with an operating system that the kernel 366 supports. As such, in response to determining the key attributes describing the operating system release (or version), the ramdisk 368 may then check whether the root file system associated with the machine image 362 contains a directory hierarchy that corresponds to the operating system release (or version). In one implementation, in response to the ramdisk 368 determining that the root file system contains the directory hierarchy corresponding to the operating system release, the ramdisk 368 may indicate that the machine image 362 supports the kernel 366, whereby the cloud image 360 may be suitably executed in the cloud computing environment 350. In one implementation, the ramdisk 368 may further attempt to determine whether the booted kernel 366 has a known vermagic string that describes an environment used to build the kernel 366 (e.g., a compiler version, architecture, whether the kernel 366 supports pre-emption, symmetric multi-processing, etc.). Thus, in response to suitably obtaining the vermagic string that describes the environment used to build the kernel 366, the ramdisk 368 may further validate whether any modules in the directory hierarchy match the running kernel 366. Consequently, the ramdisk 368 may discover situations where the booted kernel 366 has an operating system release string that matches the directory hierarchy but runs on a different kernel (e.g., a machine image 362 built for a thirty-two bit kernel but actually booted on a sixty-four bit kernel 366). Alternatively, in response to determining that the root file system lacks a directory hierarchy corresponding to the operating system release, the ramdisk 368 may contact a trusted repository 320 that contains one or more modules matching the operating system release and dynamically inject the modules into the machine image 362 (e.g., via a repository metadata server that can manage the trusted repository 320, as described in further detail in co-pending U.S. patent application Ser. No. 12/369,188, entitled "System and Method for Building Virtual Appliances Using a Repository Metadata Server and a Dependency Resolution Service," filed on Feb. 11, 2009, the contents of which are hereby incorporated by reference in entirety).

Thus, the machine image 362 may be managed independently from the ramdisk 368 and the kernel 366 to dynamically inject various modules or other content retrieved from the cloud kernel upgrade system 310 in the machine image 362. For example, in one implementation, the cloud image 360 may be further configured to include a hypervisor 364 that allows (or requires) the kernel 366 and the ramdisk 368 to be independent from the machine image 362. In particular, because the provider of the cloud computing environment 350 may limit choices for the kernel 366 to options available from the provider or other trusted vendors, whereas a user may customize the machine image 362, the pre-configured ramdisk 368 may provide the functionality for upgrading the kernel 366 without having to recreate or rebuild the machine image 362. Thus, the hypervisor 364 may manage the machine image 362 independently from the ramdisk 368 and the kernel 366 to enable changing the kernel 366 without the knowledge of the machine image 362, and further to enable the ramdisk 368 to modify the machine image 362 without requiring corresponding changes to the ramdisk 368. For example, in one implementation, the hypervisor 364 may run code in the pre-configured ramdisk 368 at a root level in the cloud image 360, whereby the ramdisk 368 may be provided with permissions to inject any suitable content into the machine image 362, including any modules needed to support a modification to the kernel 366.

Furthermore, the cloud kernel upgrade system 310 may invoke a policy engine 312 and an identity engine 314 that can communicate with the ramdisk 368 to manage the cloud image 360. For example, as described in further detail above, one or more management agents may be embedded within the cloud image 360 to control and track activity associated with the cloud image 360 (e.g., verifying that the cloud image 360 complies with any relevant policies, restricting any activity that does not comply with the relevant policies, etc.). Further, because the management agents embedded in the cloud image 360 can control, track, and monitor activity for the cloud image 360 in the cloud computing environment 350, the monitored activity may be provided to the policy engine 312 and/or the identity engine 314 to remediate the activity in response to any problems with the cloud image 360, to provide compliance assurance for the monitored activity, or otherwise analyze the activity that occurs in the cloud image 360 following deployment to the cloud computing environment. Thus, in one implementation, the policy engine 312 and the identity engine 314 may communicate with the ramdisk 368 to coordinate injecting one or more management agents into the cloud image 360, and to further coordinate subsequently removing the management agents from the cloud image 360, as appropriate.

Figure 4:
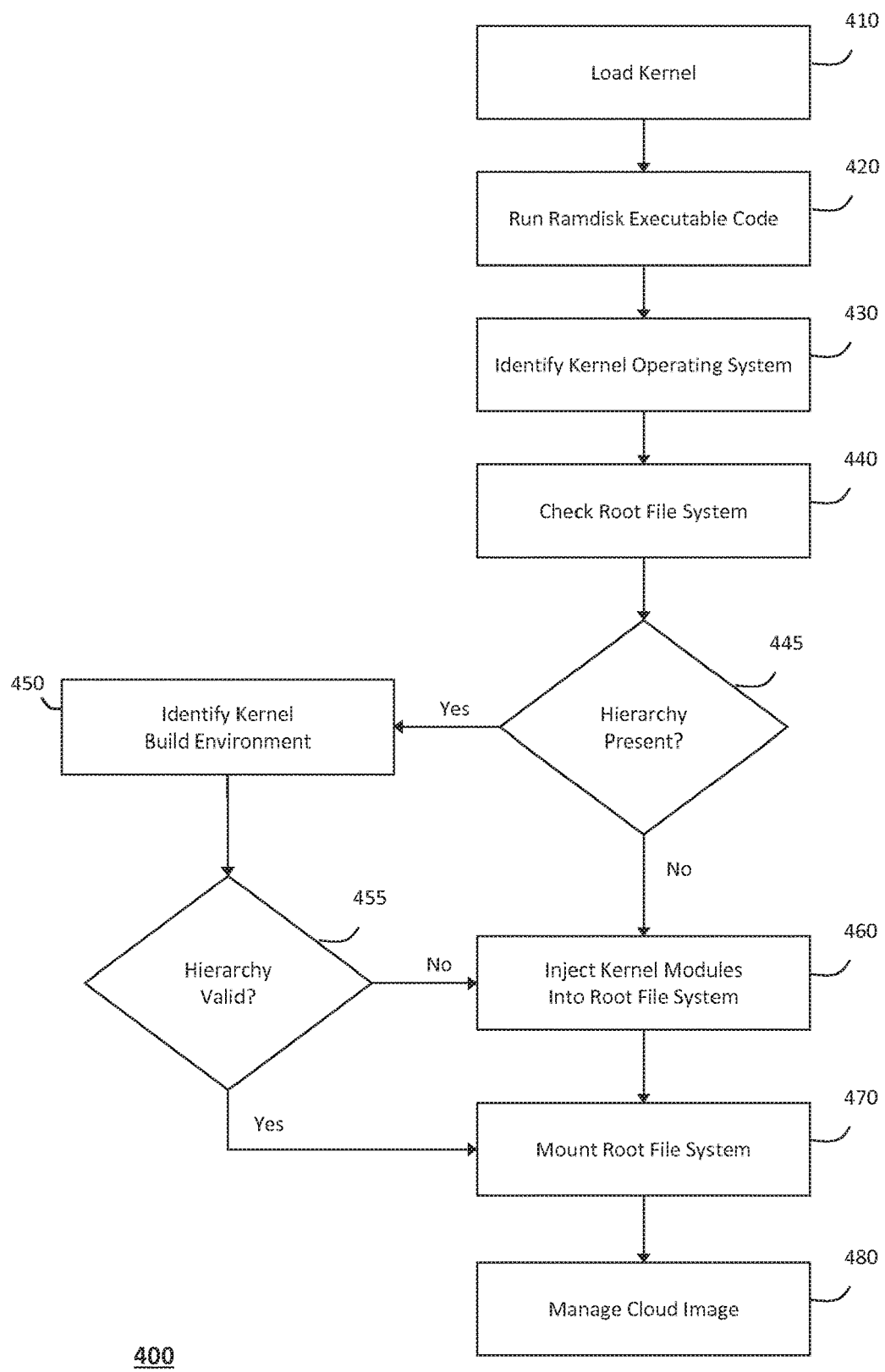
FIG. 4 illustrates an exemplary method for upgrading kernels in virtual machines hosted in clouding computing environments, according to one aspect of the invention.

According to one aspect of the invention, FIG. 4 illustrates an exemplary method 400 for upgrading kernels in virtual machines hosted in cloud computing environments. In particular, the method 400 shown in FIG. 4 and described herein may generally be performed in the system shown in FIG. 3 and described above. Furthermore, in one implementation, the method 400 may be performed during an initial boot sequence for a cloud image, which may generally include loading a kernel and running executable code in a ramdisk (or an initrd process) that can check and mount a root file system to establish a user space for running the cloud image in the cloud computing environment (e.g., as described in further detail in "The Linux Boot Process," written by Daniel Eriksen, the contents of which are hereby incorporated by reference in entirety). Alternatively (or additionally), the method 400 may be performed in response to upgrading, changing, or otherwise modifying the kernel for the cloud image subsequent to the initial boot sequence (e.g., in response to modifying the kernel, the modified kernel may be loaded and the executable code in the ramdisk automatically invoked to dynamically inject content into the root file system that supports the modified kernel, as appropriate). Thus, the method 400 shown in FIG. 4 and described herein may be performed in any suitable circumstance that involves verifying whether the root file system in the cloud image supports the kernel booted for the cloud image.

As such, in one implementation, the method 400 may be initiated in response to detecting any suitable circumstance that involves verifying whether the root file system in the cloud image supports the kernel booted for the cloud image (e.g., launching an initial boot sequence for the cloud image, modifying the kernel in the cloud image subsequent to the initial boot sequence, etc.). In particular, the method 400 may upgrade the kernel in a particular cloud image hosted in the cloud computing environment in a non-disruptive manner (i.e., without having to rebuild a machine image that contains the root file system for the cloud image). In one implementation, the cloud computing environment may be provided by any suitable entity that offers services for hosting cloud images (e.g., Amazon EC2, Eucalyptus Public Cloud, providers that offer QEMU interfaces, etc.). As such, the cloud computing environment may include various criteria for the cloud image, which the provider of the cloud computing environment typically establishes. For example, the criteria established by the provider of the cloud computing environment may provide that the cloud image can contain the root file system in a machine image that user supplies, or the provider of the cloud computing environment may provide various machine images that can be selected to provide certain functionality for the cloud image (e.g., machine images that provide functionality for Linux, Apache, or other web servers, Hadoop nodes, etc.).

In one implementation, the criteria established by the provider of the cloud computing environment may further provide that the kernel in the cloud image can be selected from various kernels available from the provider or trusted vendors, and that the cloud image can further include a ramdisk that contains various drivers and other software that supports the kernel (e.g., Xen drivers, video drivers, etc.). As such, an operation 410 may include loading the kernel chosen for the cloud image, wherein the loaded kernel may then initialize any physical resources that host the cloud image and establish an initial execution environment (e.g., to initialize schedulers, interrupt request (IRQ) handlers, etc.). In one implementation, in response loading the kernel and establishing the initial execution environment, an operation 420 may include running the executable code in the ramdisk.

In one implementation, the executable code in the ramdisk may be run at a root level to perform various processes to verify the root file system and mount the root file system to create a user space execution environment for the cloud image. For example, in an operation 430, the executable code in the ramdisk may execute a uname system call to determine one or more key attributes that describe a release (or version) associated with an operating system that the loaded kernel supports. In particular, to properly run from the root file system, the ramdisk may determine the operating system release for the kernel to ensure that the machine image contains one or more modules that the kernel needs to successfully boot and run in the cloud computing environment. For example, the ramdisk may generally include a temporary file system containing executable code that can verify whether the machine image supports the booted kernel, or alternatively to dynamically update the machine image to support the booted kernel. As such, in response to determining the key attributes describing the operating system release for the kernel in operation 430, the ramdisk may then check the root file system associated with the machine image in an operation 440.

In particular, in response to checking the root file system in operation 440, the ramdisk may determine whether the root file system contains a directory hierarchy that matches to the operating system release in an operation 445. In one implementation, in response to determining that the root file system contains the directory hierarchy that matches the operating system release, the ramdisk may then identify a build environment associated with the kernel in an operation 450. For example, in one implementation, identifying the build environment in operation 450 may include determining whether the booted kernel has a known vermagic string that describes the environment used to build the kernel. Thus, in response to suitably obtaining the vermagic string that describes the environment used to build the kernel in operation 450, the ramdisk may further validate whether the modules in the directory hierarchy properly match the build environment for the booted kernel in an operation 455. Consequently, in operations 450 and 455, the ramdisk may discover situations where the booted kernel has an operating system release string that matches the directory hierarchy in the root file system but actually runs on a different kernel architecture (e.g., the directory hierarchy in the machine image may include modules built for a thirty-two bit kernel although the booted kernel actually runs a sixty-four bit architecture).

Thus, in response to operation 455 resulting in a determination that the modules in the matching directory hierarchy do not validly match the build environment that the booted kernel actually runs, an operation 460 may include the ramdisk injecting the modules that actually support the booted kernel into the root file system. Furthermore, in response to the ramdisk determining in previous operation 445 that the machine image does not contain the directory hierarchy matching the operating system release, the ramdisk may similarly inject the modules that support the booted kernel into the root file system in operation 460. More particularly, in response to the ramdisk determining that the machine image lacks the directory hierarchy matching the operating system release in operation 445, operation 460 may include the ramdisk creating the matching directory hierarchy in the machine image, contacting a trusted repository to retrieve the modules that support the booted kernel, and then injecting the modules that support the booted kernel into the root file system. Alternatively, in response to operation 455 resulting in a determination that the modules in the directory hierarchy matching the operating system release do not validly match the build environment for the kernel, operation 460 may include the ramdisk contacting the trusted repository to retrieve one or more modules that validly match the build environment that the booted kernel actually runs and replacing the modules in the matching directory hierarchy with the modules retrieved from the trusted repository.

Thus, in response to verifying that the root file system contains the directory hierarchy matching the operating system release for the kernel and further verifying that the modules in the matching directory hierarchy validly match the build environment for the kernel, the ramdisk may then mount the root file system in an operation 470 and deliver control to a user execution space that runs the root file system in the cloud computing environment. Further, in one implementation, an operation 480 may include managing the cloud image in response to mounting the root file system in the user execution space. For example, a hypervisor in the cloud image may manage the root file system independently from the kernel and the ramdisk, whereby the ramdisk may have root level permissions to inject any suitable content into the root file system, including any management agents that can manage a lifecycle for the cloud image, executable scripts or other programs that can be executed and then removed from the cloud image (including any runtime state or other temporary changes that the scripts or other programs apply to the cloud image), or any other suitable content. Thus, managing the cloud image in operation 480 may generally include dynamically injecting any suitable content that can manage the cloud image into the root file system, including management agents that can control and track activity associated with the cloud image (e.g., verifying that the cloud image complies with any relevant policies or access controls, restricting any activity that does not comply with the relevant policies or access controls, etc.). Further, because the management agents embedded in the cloud image can control, track, and monitor activity for the cloud image in the cloud computing environment, the monitored activity may be provided to a policy engine and/or an identity engine to provide an audit trail that remediate the activity associated with the cloud image.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A method, comprising:
    identifying, by instructions of a temporary file system provided on a ramdisk, a release of an Operating System (OS) associated with a Virtual Machine (VM) within a cloud processing environment during a load of the ramdisk associated with the VM into the cloud processing environment;
    obtaining, by the instructions of the temporary file system, a directory hierarchy used with the release;
    acquiring, by the instructions of the temporary file system, a module for the OS that supports the release;
    creating, by the instructions of the temporary file system, the directory hierarchy in a root file system of the OS for the cloud processing environment without rebuilding the root file system of the cloud processing environment being maintained in memory after determining the root file system needs the directory hierarchy;
    managing and maintaining, by the instructions of the temporary file system, a machine image of the cloud processing environment that supports the VM independently from the ramdisk for the VM and a kernel for the OS of the cloud processing environment; and
    injecting, by the instructions of the temporary file system and subsequent to an initial boot sequence for the VM, the module into the root file system for supporting the release of the OS needed by the VM without recreating or rebuilding the machine image of the cloud processing environment and without changing the ramdisk by dynamically modifying the root file system to include the module without the rebuilding of the root file system.

2. The method of claim 1, wherein the injecting further comprises:
    replacing an existing module with the module within the OS.

3. The method of claim 2, wherein the replacing further comprises:

hanging a pointer that points to the existing module to point to the module.

4. The method of claim 1, wherein the injecting further comprises:
dynamically adding the module as a new module within the OS.

5. The method of claim 1, wherein the injecting further comprises:
adding additional modules into the OS for supporting features of the directory hierarchy.

6. The method of claim 1, wherein the identifying further comprises:
identifying the release when the OS is booted for the VM.

7. The method of claim 1, wherein the acquiring further comprises:
determining that files present in the directory hierarchy are missing from the root file system.

8. The method of claim 7, wherein the determining further comprises:
identifying the files as particular files that are to be processed within the VM with the release.

9. The method of claim 7, wherein the determining further comprises:
determining the file missing from the directory hierarchy by comparing particular files in the release against existing files in the machine image for the file system.

10. The method of claim 1 further comprising:
assigning, by the instructions of the temporary file system, a unique identity to the release for the OS having the module that supports the directory hierarchy integrated into the file system for the VM.

11. A method, comprising:
comparing, by instructions of a temporary file system provided on a ramdisk, a machine image of a file system of an Operating System (OS) used by a Virtual Machine (VM) against a running file system of a cloud processing environment when the VM is loaded into a cloud processing environment from the ramdisk;
identifying, by the instructions of the temporary file system, at least one file present in the machine image and missing from the running file system in response to the comparing;
injecting, by the instructions of the temporary file system, a kernel module into the OS that supports the file in response to the identifying after an initial boot sequence for the VM into the cloud processing environment;
managing and maintaining, by the instructions of the temporary file system, a cloud processing environment machine image independently from the ramdisk for the VM and a kernel for the OS of the cloud processing environment;
updating, by the instructions of the temporary file system, the running file system with the at least one file without rebuilding the running file system and without recreating or rebuilding the cloud processing environment machine image and without changing the ramdisk by dynamically modifying the running file system to include the kernel module without the rebuilding of the running file system.

12. The method of claim 11, wherein the comparing further comprises:
initiating the comparing upon an attempted reboot of the OS.

13. The method of claim 11, wherein the injecting further comprises:
requesting the kernel module from a third-party service.

14. The method of claim 11, wherein the injecting further comprises:
obtaining the kernel module from the machine image.

15. The method of claim 11, wherein the injecting further comprises:
searching for and locating the kernel module in response to identifying the at least one file.

16. The method of claim 11 further comprising:
assigning a unique identity to the file system having the updated at least one file.

17. A system, comprising:
a cloud computing environment;
a plurality of Virtual Machines (VMS) configured to process within the cloud computing environment; and
at least one physical processor within the cloud computing environment configured to execute program instructions representing a ram disk process of a temporary file system provided on a ramdisk, which when executed cause the at least one physical processor to:
identify a modification to an operating system (OS) used by at least one of the VMs during a load of the at least one VM from the ramdisk;
obtain a directory hierarchy not supported in a root file system of the cloud processing environment;
inject a kernel module into the OS that supports the directory hierarchy after an initial boot sequence for the VM;
manage and maintain a machine image for the cloud processing environment independently from the ramdisk for the at least one VM and a kernel for the OS with respect to the kernel module of the cloud processing environment;
update the root file system with the directory hierarchy without rebuilding the root file system of the cloud processing environment and without recreating or rebuilding the machine image for the cloud processing environment and without changing the ramdisk by dynamically modifying the root file system to include the kernel module without the rebuilding of the root file system.

18. The system of claim 17, wherein the program instructions further cause the at least one physical processor to:
identify the modification is identified during a boot of the at least one VM.

19. The system of claim 17, wherein the program instructions further cause the at least one physical processor to:
inject the kernel module further includes locating the kernel module in response to at least one file in the directory hierarchy.

* * * * *